United States Patent Office 3,846,075
Patented Nov. 5, 1974

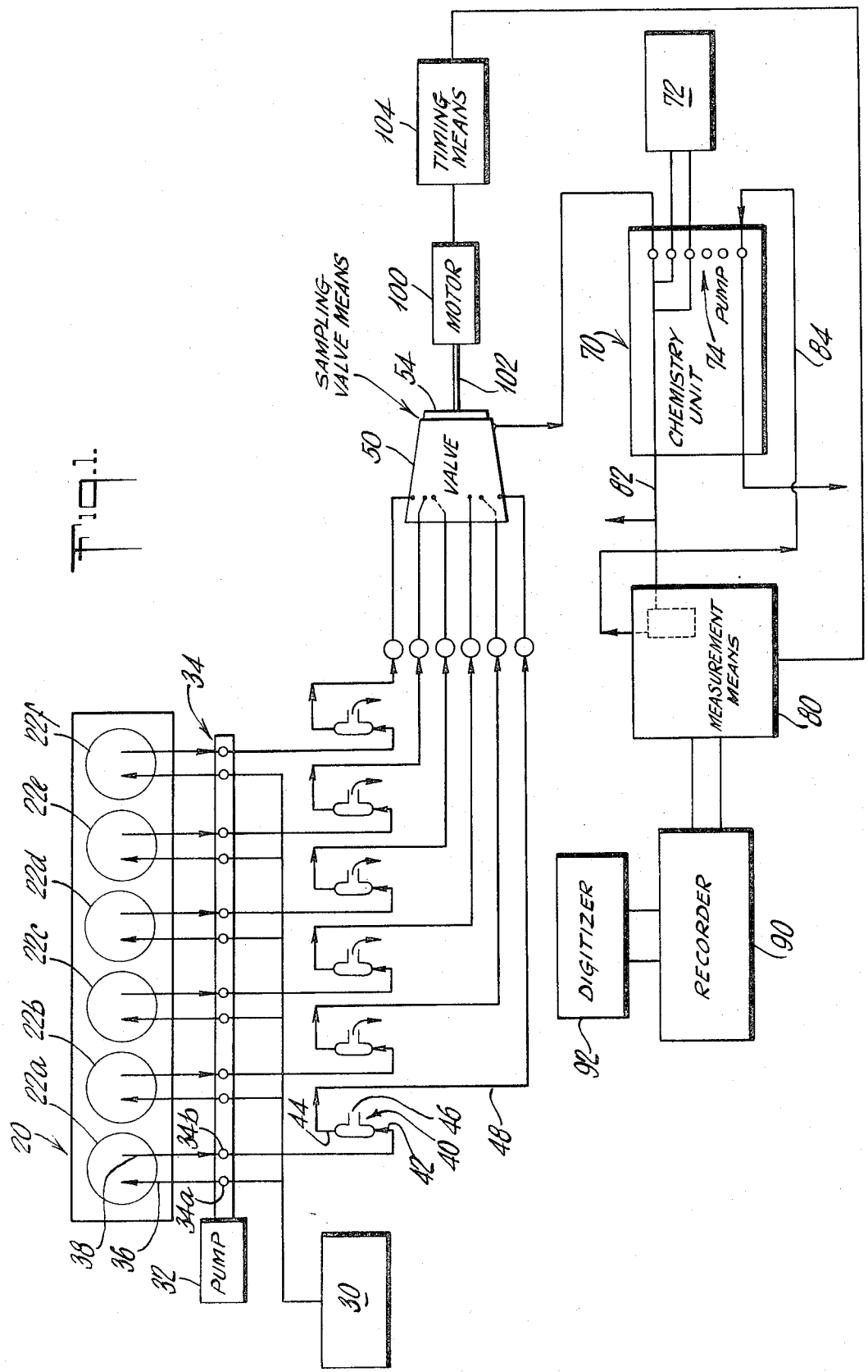

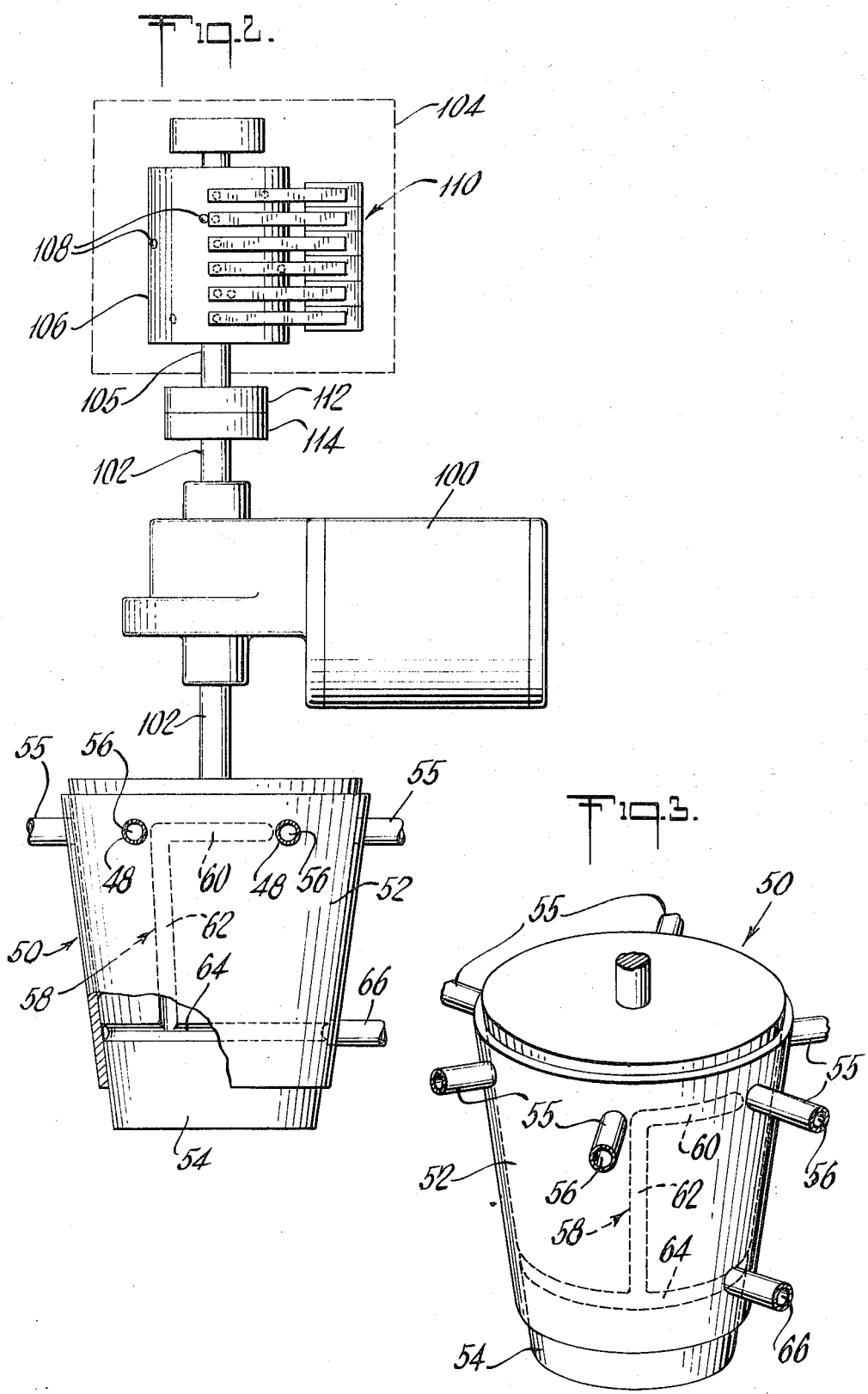

3,846,075
APPARATUS FOR SIMULTANEOUS ANALYSIS OF FLUID
Francis J. Cioffi, Somerville, N.J., assignor to E. R. Squibb & Sons, Inc., Princeton, N.J.
Filed Sept. 25, 1972, Ser. No. 292,237
Int. Cl. G01n 1/10, 1/14
U.S. Cl. 23—253 R    12 Claims

ABSTRACT OF THE DISCLOSURE

An automated analysis apparatus for the simultaneous assay of fluid from a multiplicity of fluid supply cells. Fluid from several cells is pumped to an automatic sampling valve, which sampling valve selectively transmits fluid from consecutive supply conduits to the assay means. Timing means, activated by the same means which drives the sampling valve, selectively activates the assay means. The data generated by the assay means is recorded by data acquisition means. The system is provided with overflow means to discharge fluid from conduits which are not sampled, and the cells are continuously fed solvent to replace the fluid discharged for sampling.

BACKGROUND OF THE INVENTION

The present invention relates to apparatus for the simultaneous assay of fluid from a multiplicity of fluid supply cells.

A particular application for such apparatus is the dissolution rate testing of medicinal preparations; particularly the tablet form. For various resasons, it is necessary, in the drug industry to have precise data regarding the dissolution rate of particular drugs. The equipment used for such a test is rather expensive, and where each tablet is to be tested separately, the procedure is very time consuming. The apparatus tends to be overworked as it must operate continuously during the individual and consecutive testing of each tablet. This naturally tends to shorten the life of the equipment.

The many prior art attempts at providing adequate apparatus have generally not been completely successful. Specifically, in most embodiments at least some of the components of the test apparatus must be duplicated. For instance, a spectrophotometer is often used in the fluid measurement and in present systems must be of the multi-cell variety for the simultaneous testing of several tablets. Similarly, most systems utilize automated chemistry systems for the introduction of reagents and diluents and the like. The cheapest and most reliable of these units are adapted to function for one supply cell at a time.

The present invention provides apparatus which solves the problem in a novel manner. It permits the simultaneous testing of several tablets at the same time but also offers the capability of limiting much of the test apparatus to operation on a single test sample at any particular time. In other words, the present system permits the optimum utilization of the testing apparatus without placing an undue burden on the critical components. The several tablets can be tested in the time it used to take to test a single tablet. Thus, the required data is generated much quicker than in prior systems.

The apparatus herein disclosed offers other positive features. "Sink" conditions are maintained at all times by using a continuous dilution technique which provides better dissolution data. By sink conditions it is meant that there is no impediment ot further dissolution by a concentration build-up. The sample solution does not have to return to the fluid cell and therefore assays requiring reagent addition are easily done. Apparatus developed by others are capable of assays only where the samples are returned to the dissolution flask after being read in a spectrophotometer in order to maintain constant volume. Additionally, the apparatus detailed herein is modular making possible simple substitutions of modules, assay techniques and apparatus components. Also, simplified versions of the apparatus may be easily constructed to satisfy individual needs.

The apparatus to be detailed herein has application other than dissolution rate testing. This particular application, however, offers an environment which is extremely illustrative of the use of the apparatus. The foregoing discussion therefore, utilizes that environment for the best understanding of the interaction of the components. However, it should be clear that the apparatus to be described finds great utility for other applications calling for the simultaneous analysis solutions.

SUMMARY OF THE INVENTION

It is an object of the present invention to provide apparatus for the simultaneous assay of fluids from several fluid supply cells.

Another object of the present invention is the provision of analysis apparatus which permits optimum utilization of the various components.

Yet another object of the present invention is the provision of analysis apparatus which is relatively inexpensive, reliable and easy to assemble.

In accordance with the above designs, apparatus for the simultaneous assay of fluid from several fluid supply cells performs the necessary tests, and generates the required data in the same time it takes to test a single cell. In a specific use, the several cells each contain a tablet of a medicinal preparation being tested for dissolution rate. The tablets are lowered into cells containing suitable solvent. A solvent reservoir continuously pumps solvent into the cells to maintain a constant solvent volume in each cell. A multi-channel pump delivers the solution to an automatic sampling valve. Only one solution is tested at any particular time, therefore, the solutions pumped to the sampling valve, but not sampled, are discharged from the system. The automatic sampling valve is motor driven, and by means of a cooperating channel and several conduits, selects consecutive fluid samples for testing. Specifically, the valve plug has a channel which selectively registers in fluid communication with consecutive conduits. The selected solution, via the channel, is delivered to an optional automated unit which adds reagents, diluents and the like prior to measurement. Thereafter, the fluid is pumped into a spectrophotometer or flourometer or other suitable measurement device. After such assay, the response generated by the spectrophotometer or fluorometer is suitably recorded by a data acquisition unit, which unit may include suitable means for graphic representation as well as a punched tape for computerized analysis.

The various components which analyze and acquire the data are controlled by a timing means. That means comprises a programmed drum driven by the same means that operates the valve, and that drum cooperates with switching means suitably connected to the assay and data acquisition units.

The individual sampling and assay takes a short period of time. After such a test has been completed the sampling valve selects the next consecutive cell and passes the fluid for a similar test. The sampling of the various fluids is continued, with a particular solution being sampled several times, until an acceptable dissolution profile is obtained.

DESCRIPTION OF THE DRAWINGS

FIG. 1, is a diagrammatic of the various modules of the present invention.

FIG. 2, is a partially cut-away perspective view showing the sampling valve and timing means assembled to the shaft.

FIG. 3, is a perspective view of the sampling valve.

DETAILED DESCRIPTION

The apparatus embodying the instant invention is diagrammatically illustrated in FIG. 1 in modular form. This discussion utilizes a tablet dissolution testing system to best describe the invention, but it should be understood that the invention has application to many chemistry systems calling for simultaneous assay. Also, modules may be easily substituted or added to suit the various needs of the user.

A multiplicity of fluid supply cells, shown here as a six-flask dissolution apparatus 20 provides the fluid to be tested. An example of such an apparatus is the Scientific Glass Apparatus Co. Model T–1044–20x. Briefly, a medicinal tablet to be tested for dissolution rate, is lowered into a bath of solvent which may be preheated. The tablet is confined in a perforated basket and dissolves in the bath. The baskets are lowered into their corresponding baths at staggered times as determined by the chosen sampling interval.

The solvent level in the cells 22 is maintained by constant replenishment from a solvent reservoir 30. A multi-cell pump 32, such as a Cole Parmer Co., Servodyne Power Drive System (Cat. No. 7555x) is shown with 12 cells 34, one each to pump in solvent (conduit 36) and one each to pump out a sample (conduit 38) for testing. This unit consists of 12 pumps all driven by one power drive system to insure identical flow into and out of each dissolution flask. The feature of constantly replenishing solvent is quite important since "sink" conditions can be maintained. In other words there is no misleading concentration build-up which could adversely affect further dissolution.

The fluid pumped out of each cell 22 flows through conduits 38 and into discharge means 40. These discharge means can be T shaped with inlet ports 42 and outlet ports 44 and 46. Outlet ports 44 admit fluid into conduits 48 which transmit the fluid into other modules of the system. Outlet port 46 discharges, to waste, all the fluid not being sampled at any time. In practice, full conduits 48 register with the sampling valve means 50, with the overflow passing to waste through outlet port 46.

The sampling valve means is described in detail in applicant's copending application, Ser. No. 292,036 filed Sept. 25, 1972 and shown in FIGS. 2 and 3. Briefly, the sampling valve means 50 comprises an outer barrel member 52 and an inner plug member 54 contiguously received in the outer member 52. The conduits 55 are each in fluid communication with ports 56 formed in the outer member 52. A three section channel 58 is formed in the plug 54 with the walls of barrel 52 forming a closure therefor. The channel 58 top section 60 is slightly shorter than the distance between two successive ports 56. This permits all flow through the valve means 50 to be intermittently stopped, the reasons for which will be evident as the description continues. The channel 58 midsection 62 transmits fluid from top section 60 (when said section is in fluid communication with a selected port 56) to a bottom section 64. That bottom section is circular and passes the fluid through pipe 66 formed in the barrel 54, which pipe and barrel are in continuous fluid communication. Thereafter, the selected fluid passes into conduit 68 and into the rest of the system for purposes hereinafter described. The valve means 50 just described is but one embodiment suggested in the reference patent application.

After the selected sample fluid has been passed by the sampling valve 50 into the conduit 68 it enters assay means which includes a chemistry unit shown generally as 70. The chemistry unit contains means 72 to add reagents, diluents or other desired chemicals, and a pump 74 (multi-channel) to both pump in the reagents and diluents and also to pump the fluid into the next module.

After the fluid has been suitably worked on in the chemistry unit 70 it is pumped (pump 74) into a measurement means 80 part of the assay means by way of conduit 82. The measurement means 80 can be preferably a fluorometer (such as Perkin Elmer Model 203 or 204) or a spectrophotometer (such as Beckman Model DBG or DBG–T or Hitachi Model 139 or 124). Other measurement techniques may be used but ideally the measurement is accomplished by measuring the light absorption by, or fluorescence intensity of, the particular chemical specie analyzed. The instrument should preferably be the double beam type to eliminate drift and in some cases to provide compensation. A particular advantage of the present system may be indicated at this point. The spectrophotometer or fluorometer used for the measurement is of the single cell type. The prior art systems needed as many cells as there were tablets to be analyzed. Obviously, the present system permits the use of measurement means which are less expensive and more reliable than those used in prior art systems.

After analysis, the fluid can be discharged from the system via conduit 84. The pump 74, also accomplishes this task.

The data generated by the spectrophotometer or fluorometer can be suitably recorded for graphical analysis. A fast response recorder 90 such as the Sargent Model SRL of the Perkin Elmer Model 165 is quite adaptable for these purposes. Further, the data can be digitized for computer analysis. A digitizer 92, such as the Infotronics CRS230E integrates well with the system. A further addition to the system can be a teletype unit which can produce a punched tape.

The apparatus thus far described is characterized by its modularity. Modules can be added, subtracted or substituted to suit the needs of a specific system. This feature permits this type apparatus to be adaptable to a wide variety of uses wherein several fluids require simultaneous analysis.

In obtaining complete dissolution profiles, the fluids are sampled several times. To do this a motor 100 drives a shaft 102. That shaft 102 is connected to the plug 54. The rotation is preferably constant and at about ⅓ or ½ revolution per minute. As the plug 54 rotates, the channel top section 60 fluidly communicates with the various ports 56. It is during this communication that the fluids are assayed. Of note, in this embodiment the top section does not fluidly communicate with more than one conduit at a particular time; there are intermittent instants in which no fluid is being sampled. This permits the residual sampled fluid in the system to be discharged, or even provides a period for washing the system if that be desired. Of course this washing can be accomplished by providing an extra conduit in the system which introduces a washing solution.

Of importance in the aforementioned system is the synchronization of the various modules such that the various operations are properly timed. As seen in FIG. 2, the shaft 102, as driven by the motor 100 drives the timing means 104. A programmed drum 106 is journaled onto a shaft 105 which is rotated by shaft 102. A series of spaced detents 108 on the drum 106 cooperate with suitable switch means 110 to generate the proper timing signals. These signals serve basically to reset or initialize the data acquisition means 92 inasmuch as the spectrophotometer can operate continuously. The detents 106 are spaced such that the data acquisition means 92 is initialized just as a sampled fluid enters the spectrophotometer.

A further characteristic of the timing of the apparatus should be indicated. In any given set-up the time it takes for a sample to go from a fluid cell 22 to the spectrophotometer 80 is known. It is desirable to initiate digitizing at the instant the just sampled fluid reaches the spectrophotometer 80. For this purpose the shaft 105 is coupled to the shaft 102 by means of a magnetic clutch. By tripping an appropriate switch, after the proper time passage, the magnetic plates 110 and 112 are coupled and shaft 105 rotates.

It has been seen that a novel modular fluid assay apparatus provides for the simultaneous assay of fluid from a multiplicity of supply cells. Interaction between the various modules is efficient and dependable. Modifications and adaptations are readily permissible within the scope of the invention. The system herein described produces superior data in a much shorter time period than in prior art systems and the various modules are efficiently and economically utilized.

Various changes may be made in the details of the instant invention without departing from the spirit and scope of the claims and are intended to be embraced therewithin.

What is claimed is:

1. Apparatus for the simultaneous analysis of fluid from a multiplicity of fluid supply cells comprising:
    (a) means to remove a constant flow of fluid from said supply cells and deliver a constant supply of fluid to a sampling valve means;
    (b) sampling valve means adapted for automatic selective sampling of the delivered fluid samples, said valve means comprising a hollow truncated conical barrel as an outer member and a truncated conical plug as an inner member contiguously received in said outer member, means to rotate one of said members relative to the other about a common axis, at least two conduits for the transmission of fluid to said valve connected to said barrel, all said conduits connected at points in a single plane perpendicular to said common axis, the plug including a peripheral channel, the contact between said inner and outer members forming a closure for said channel, a discharge passage in fluid communication with one of said members and said channel, said channel comprises a first section generally lying in the same plane as said conduits and being of a length less than the distance between two consecutive conduits, a second section in fluid communication with, and at an angle to, said first section, a third section in fluid communication with said second section and said discharge passage, said channel adapted to register with, and pass fluid from, said conduits to said discharge passage;
    (c) assay means to measure the selected fluid samples in fluid communication with said sampling valve means; and
    (d) timing means interconnecting said sampling valve means and said assay means to activate and control said assay means.

2. The apparatus of claim 1 said timing means including a programmed drum cooperating with switch means to regulate said assay means.

3. The apparatus of claim 1 comprising:
    (a) a motor active on said sampling valve means;
    (b) a shaft driven by said motor;
    (c) timing means to activate and control said assay;
    (d) a programmed drum driven by said shaft; and
    (e) switch means, said drum cooperating with said switch means to regulate said assay means.

4. The apparatus of claim 3 including a magnetic clutch adapted to selectively couple said drum to said shaft.

5. The apparatus of claim 1 wherein the flow to said valve means from said cells is continuous and including overflow means to permit the discharge of fluid not being sampled at a particular time.

6. The apparatus of claim 1 wherein the assay means includes means to add reagents and diluents to the sampled fluids.

7. The apparatus of claim 1 including data acquisition means to record data generated by said assay means.

8. The apparatus of claim 1 including means to constantly replenish the cells with fluid.

9. The apparatus of claim 1 including means to discharge the fluid after analysis.

10. The apparatus of claim 1 wherein said fluids to be analyzed are composed of tablets partially dissolved in solvent.

11. In the apparatus of claim 1 said means to deliver said fluid comprising a pump and conduits in fluid communication with said cell and said sampling valve.

12. The apparatus of claim 1, said assay means including a spectrophotometer.

References Cited
UNITED STATES PATENTS

| | | | |
|---|---|---|---|
| 3,481,709 | 12/1969 | Slone | 23—259 X |
| 3,623,844 | 11/1971 | Anthon | 23—259 X |
| 3,635,680 | 1/1972 | Peoples et al. | 23—259 X |
| 3,690,833 | 9/1972 | Ferrari | 23—253 X |
| 3,728,079 | 4/1973 | Moran | 23—259 X |
| 3,753,657 | 8/1973 | Downing et al. | 23—259 X |

R. E. SERWIN, Primary Examiner

U.S. Cl. X.R.

23—259; 73—423 A; 137—625.4